United States Patent [19]

Lieberman

[11] 3,957,413

[45] May 18, 1976

[54] APPARATUS FOR PRODUCING HIGH-SPEED PRODUCTION OF A PRESSURE GENERATING PRODUCT

[76] Inventor: Abraham Buddy Lieberman, 4755 Boulevard des Grandes Prairies, St. Leonard, (Montreal 457), Quebec, Canada

[22] Filed: Jan. 25, 1974

[21] Appl. No.: 436,658

[52] U.S. Cl. .............................. 425/371; 264/165; 425/4 C

[51] Int. Cl.² .............................. B29C 3/00

[58] Field of Search ............ 425/4 C, 371, 335, 224, 425/223; 264/47, 165

[56] References Cited

UNITED STATES PATENTS

| | | | |
|---|---|---|---|
| 1,185,399 | 5/1916 | Hayes | 425/371 |
| 2,602,960 | 7/1952 | Fischbein | 425/371 |
| 2,975,470 | 3/1961 | Snelson et al. | 425/371 X |
| 3,064,590 | 11/1962 | Thiele | 425/371 |
| 3,223,027 | 12/1965 | Soda et al. | 425/371 X |

*Primary Examiner*—Robert L. Spicer, Jr.

[57] ABSTRACT

The herein described Apparatus and Method of Producing High-speed Production of a Pressure Generating Product consists of one or more main conveyor units that may be connected together to form a continuous production line, and in which each conveyor unit is formed of upper and lower main parallel conveyors that are provided with endless platen belts, the platens having their opposing ends secured to outer main endless roller bearing link-chains and driven by a suitable source of energy. Intermediate conveyors are secured within the apparatus and located within each of the upper and lower main conveyors and formed of inner parallel endless roller bearing link-chain units effecting independent movable support and pressure means for the platens and independently supported and driven separately from the outer main endless roller bearing link-chains.

4 Claims, 9 Drawing Figures

APPARATUS FOR PRODUCING HIGH-SPEED PRODUCTION OF A PRESSURE GENERATING PRODUCT

The invention relates to Improvements in an Apparatus and Method of Producing High-speed Production of a Pressure Generating Product, as described in the present specification and illustrated in the accompanying drawings that form apart of the same.

The invention consists essentially in the novel apparatus and method employed for producing a high-speed continuous production of a pressure generating product consisting of a main conveyor unit formed of upper and lower longitudinal endless platen belts, made of platen sections, and extending parallel with one another and sprocket-driven outer main endless roller bearing link-chains engaging and operating the ends of the platen sections at a predetermined rate of speed; the inclusion of intermediate conveyors within the upper and lower endless platen belts and which are formed of sprocket-driven inner parallel endless roller bearing link-chain units and which are in rolling contact between the movable rail sections that are individually secured to the underside of their respective platen sections and the longitudinal fixed rails that are secured to the main conveyor unit. As pointed out broadly and specifically in the claims for novelty following a description containing an explanation in detail of an acceptable form of the invention.

In the past, methods and apparatus have been used to make foam boards and other articles, in which normal endless chain drive conveyors utilized platens to form endless belts or carriers that were guided or pulled through compression sections by the endless chain drive mechanism. This pulling tended to pull apart slightly the platens from one another, with the result that gaps were formed between the platens. Furthermore, the normal endless chains were required to overcome or materially reduce the friction between the platens and the roller bearings which formed a part of the base or support for the endless chains. This was found impossible to successfully carry out, and the result was that a "dragging" operation occurred, which materially decreased the efficiency of the apparatus and affected its volume output.

In such conveyors or other equivalent types, the platens were supported by attached roller bearings, and high pressure caused platen deflections and the consequent variations became evident in the platens' vertical movement. In other instances, roller bearings with attached ends have been used; however, the mass of metal involved required extremely heavy machine structure which created excessive friction. In addition, it was overly cumbersome, and any inaccuracy in the lineup of the roller bearings caused side movements of the platens, and made it difficult to align them.

Previous conveyors, whether of the ordinary carrying conveyor type, or the pressurized type of conveyor which had top and bottom platens retained under increasing pressures while being moved parallel to one another, or through pressures that rose from expanded material located between opposed platens of the upper and lower sections of the conveyor unit, generally had low friction roller bearings and the axes of the roller bearings were usually attached to the platens, and these roller bearings were attached at convenient positions over or under the platens. In such systems, the pressures that were applied required many more roller bearings under or over the platens that could be economically or physically used.

It is therefore the purpose of this invention to avoid objectionable features and disadvantages which have been found in such methods and apparatus that have been used in the manufacture of pressurized generated products, as well as to overcome their limitations through devising a novel method and means that will materially reduce frictional "drag", by including in the apparatus a plurality of intermediate conveyors formed of endless roller bearing link-chain units and effecting independent movable support and pressure means to the platens and which are independently supported and driven separately from the operative means of the main endless roller bearing link-chains, which will have the effect of pulling the platens at the point where they would normally "drag", thereby not only effectively reducing friction but causing the platens to be drawn close to one another and thus avoid any gap between the platens.

In the present invention, while using platens and chains as above described, intermediate conveyors formed of endless roller bearing link-chains are situated beneath or above the platens and effect intermediate movable support and pressure means for the platens and are operated independently of the operative means for the main chain drive conveyor, thereby materially alleviating the load of the platens from the main chain drive conveyor units and thus eliminating most of the "drag" by the platens on the endless roller bearing chain units and thereby materially reducing friction. Furthermore, by increasing the lineal speed of the intermediate conveyors over the speed of the main drive conveyors, the platens will have a tendency to crowd each other and avoid any gaps therebetween.

In this invention, the method employed does not use the axes or centres of the roller bearings, which usually support the load of the platens, but in this instance the roller bearings are free to rotate between the platens and the fixed rails that are secured to the framework of the apparatus, and since the main weight of the endless platen belts is movably supported and pressurized by the intermediate conveyors, the main load is lifted from the main chain drive conveyor units, which merely pull and guide the platen belts along the intermediate conveyors; this results in the platens, which have their ends attached to the main chain drive conveyors, being driven or drawn over the roller bearing surfaces and thereby causing the platens to be transformed from a "dead" weight to a "live" weight.

It has been found that having the roller bearings attached to each other through their axes, such as ordinary endless roller bearing chains, provides a maximum amount of roller bearing surfaces capable of withstanding tremendous pressures, as for example when moving very heavy objects by placing rollers under them. While the main endless roller bearing chains are drawing the platens with them by one source of energy, simultaneously the intermediate conveyors are being torque-driven by a separate source of energy, their input being slightly faster than the drive of the main endless roller bearing chains, one of the purposes of which is to avoid slippage which otherwise would occur between the endless supporting roller bearing chains and therein-place cause the platens to maintain an abutting position with respect to one another, which has the result of ending up with approximately friction-free sets of roller bearings, as the pressure of the load has been practically removed from the axes of the roller bearings.

The axes of the roller bearings are now being utilized for pulling or driving the platens ahead, as well as to space the many roller bearings equally behind each other and as a driving force without pulling the platens apart. The fact that the intermediate conveyors are actually relieving the work load of the main roller bearing chains results in a method whereby conveyors may now be extended in very long lengths without having to involve tremendous power to pull the platens.

Among the objects of the invention are to devise an apparatus and method to maintain a constant pressure over the entire lengths of the conveyor units and to assure that the top and bottom surfaces of the upper and lower sections of the conveyor units will remain parallel, flat, synchronized and with the minimum gap between the platens of the conveyor platen belts.

Another object of the invention is to utilize the axes of the roller bearings for pulling or driving the platens ahead, as well as to space the many roller bearings equally behind each other and as a driving force without pulling the platens apart and without being attached to the platens.

A further object of the invention is to devise an apparatus for the continuous production of foam and the manufacture of articles made therefrom that will be easy to clean and to create free riding, freewheeling system for transporting the foam and its accompanying skin material, and simultaneously converting the same into the required article in one continuous, controlled process, with no conveyor length limitations and assuring accuracy by rigid, precisely adjusted pressure sections, and utilizing restrained rise principle to allow maximum thizotropic dispersions of chemicals and formulations.

A still further object of the invention is to provide an apparatus and method for continuously producing foamed-cored laminates and other articles either as continuous sections or as individual panels.

The above and further objects and advantages of the invention will become apparent from the ensuing disclosure relating to a preferred embodiment selected by way of illustration but not of limitation and illustrated in the accompanying drawings.

In the following description and in the claims, various details will be identified by specific names for convenience; the names, however, are intended to be generic in their application.

IN THE DRAWINGS

Like numerals of reference indicate corresponding parts in the various figures.

Figure 1:
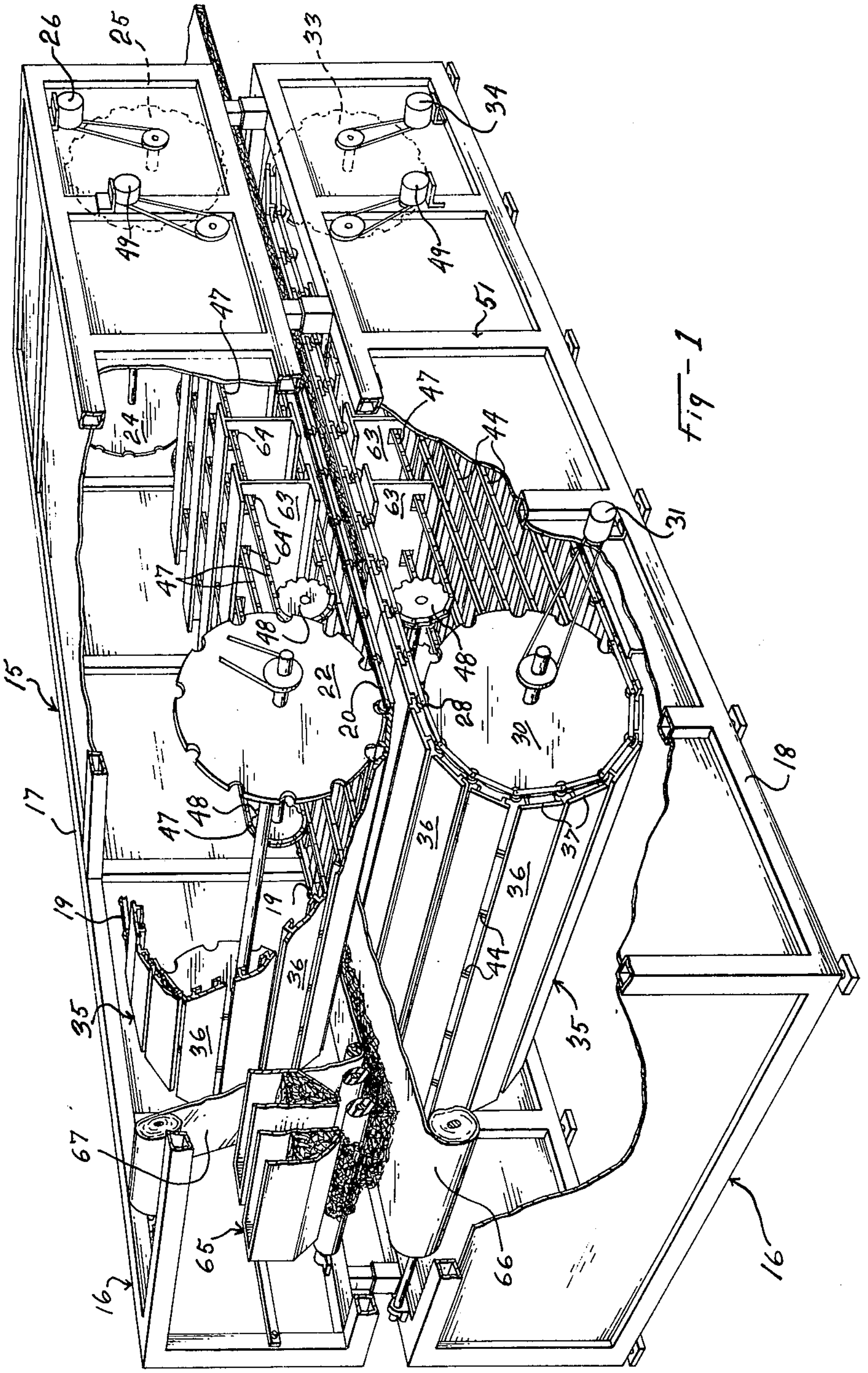
FIG. 1 is a perspective fragmentary view of the apparatus.
Figure 2:
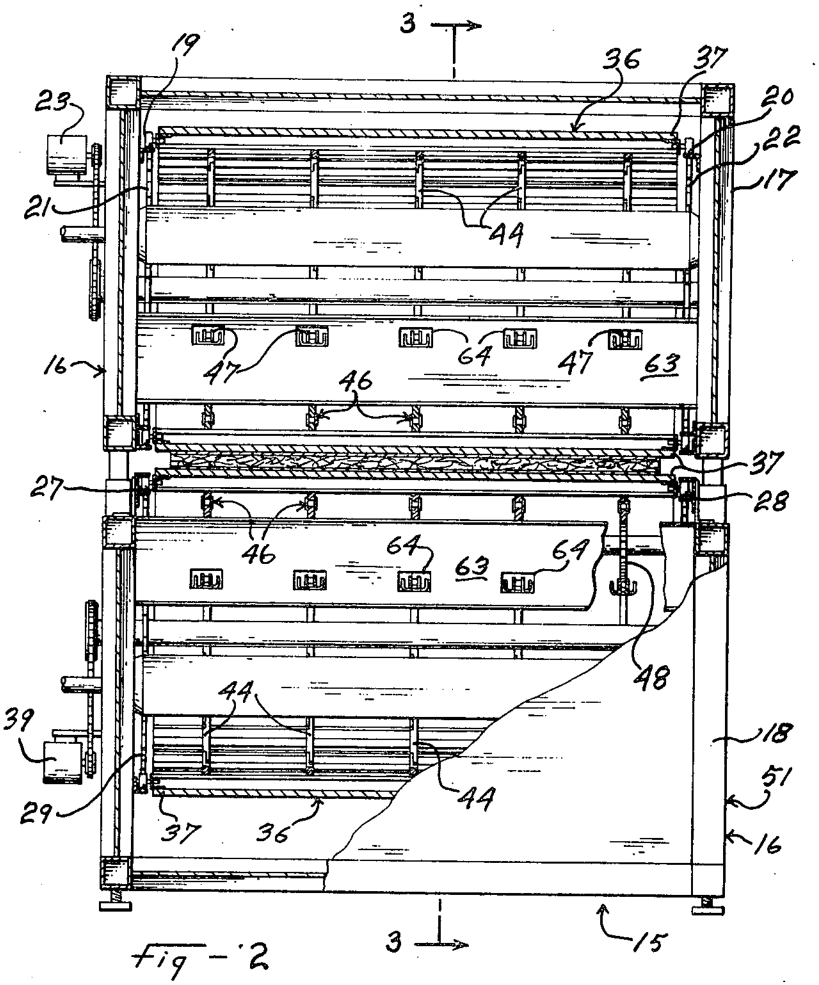
FIG. 2 is a vertical fragmentary sectional view of the apparatus as taken along the line 2—2 in FIG. 1.
Figure 4:
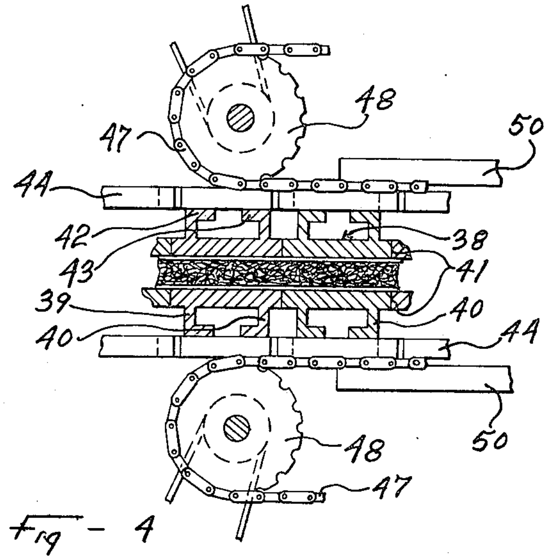
FIG. 4 is an enlarged fragmentary sectional view of the parallel portions of the upper and lower platens for the intermediate conveyors and their compressive engagement with the bottom and the top surfaces of a foam laminate being made.
Figure 3:
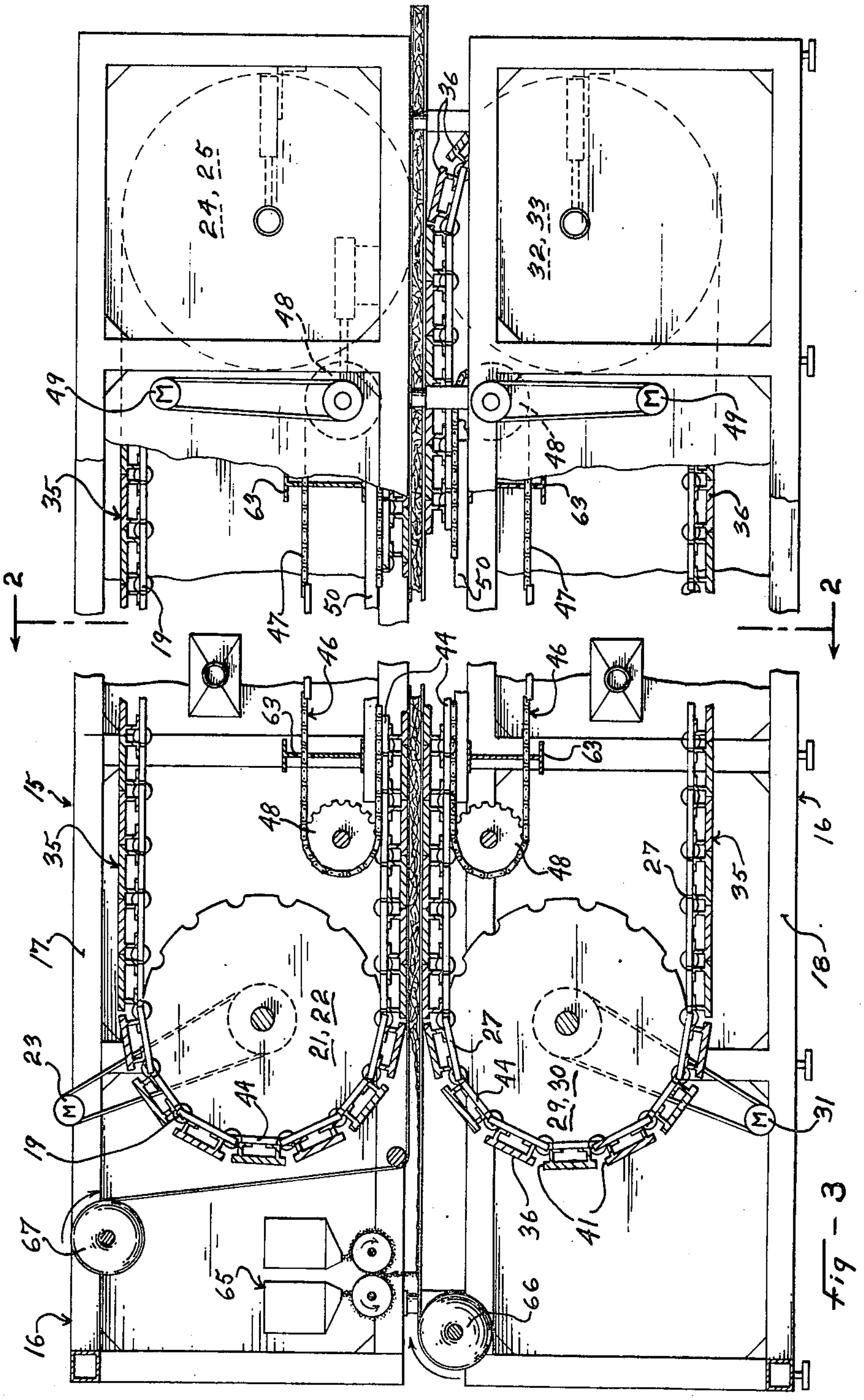
FIG. 3 is a longitudinal sectional view of the apparatus as taken along the line 3—3 in FIG. 2.
Figure 6:
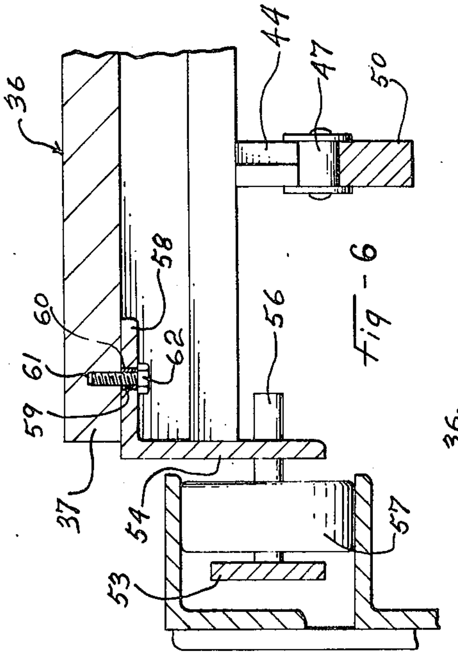
FIG. 6 is an enlarged fragmentary sectional detail, showing how a platen end is attached to a main chain drive conveyor unit.
Figure 7:
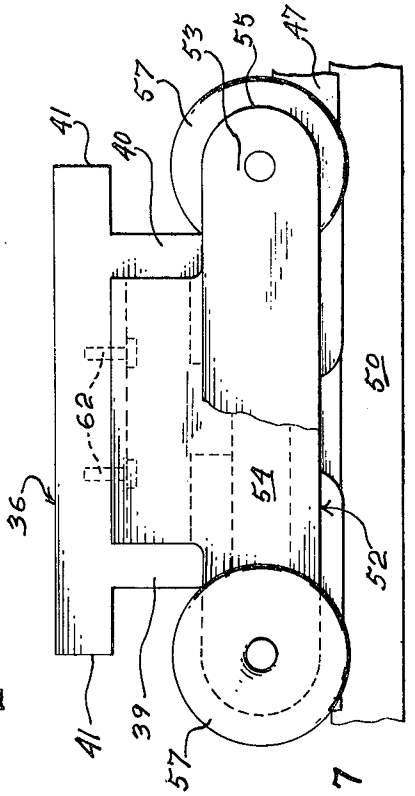
FIG. 7 is an enlarged side view of a platen attached to a main drive conveyor unit.
Figure 5:
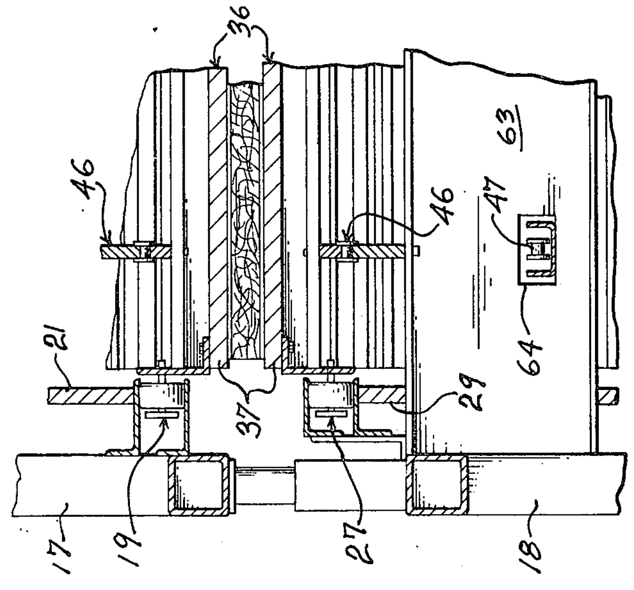
FIG. 5 is an enlarged fragmentary sectional detail of the assembly of the upper and lower platens to the main chain drive conveyor units and to the intermediate endless roller bearing link-chain units of the intermediate conveyors.
Figure 8:
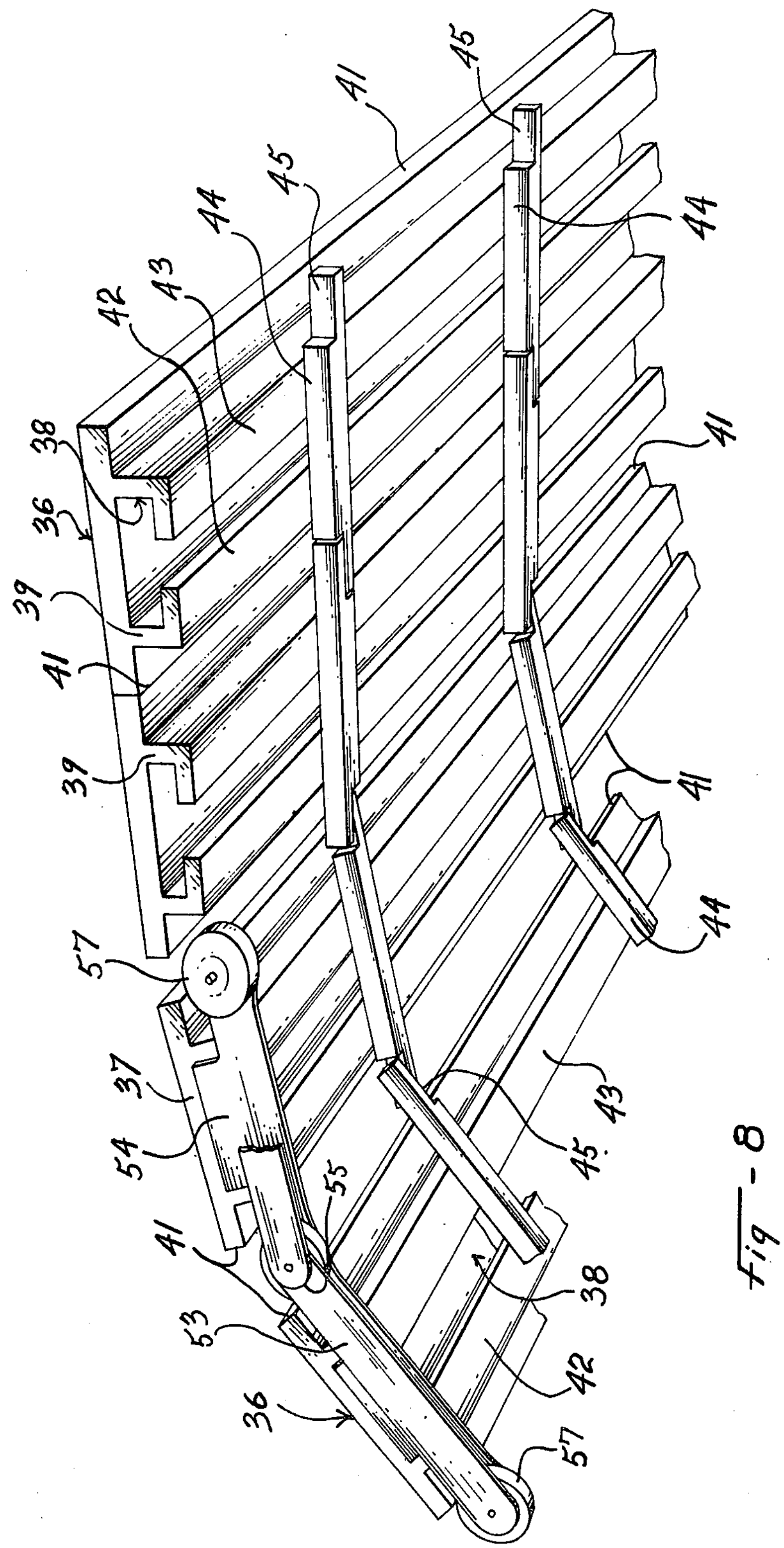
FIG. 8 is a fragmentary perspective view of the underside of a plurality of platens, illustrating how they are attached to a main chain drive conveyor unit and to the intermediate sectional rails which are adapted to engage with the intermediate conveyors.
Figure 9:
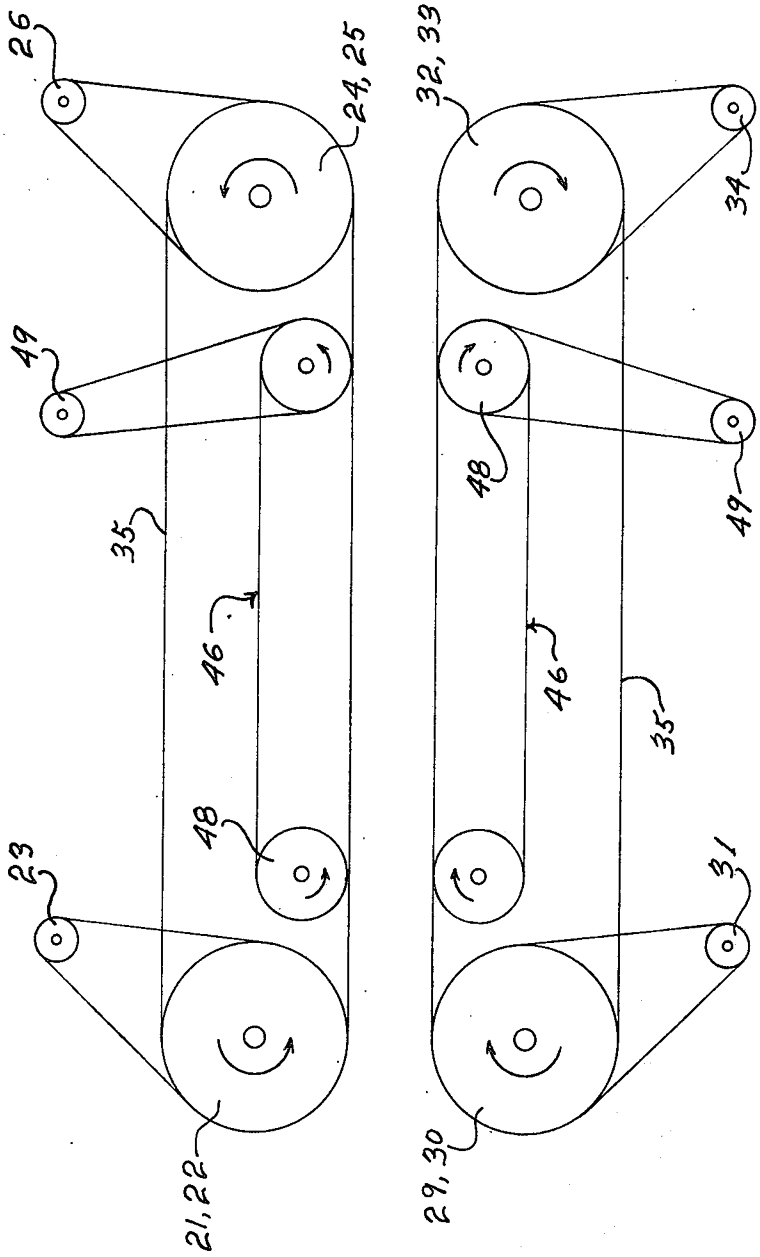
FIG. 9 is a diagrammatic view of the upper and lower main conveyors and the upper and lower intermediate conveyors of the apparatus and showing an acceptable method of the independent means for operating the main conveyors and the intermediate conveyors separately from one another.

In describing an acceptable method and apparatus for carrying out the invention, the description of the disclosures and the accompanying drawings specify that it is applicable for the production of a pressure generating product, such as foam laminates, but it will of course be understood that the invention may be used for the production of other products, whether rigid, flexible, cellular or homogenous.

Referring to the drawings, the apparatus, as indicated by the numeral 15, consists of one or a plurality of main conveyor units 16 (only one conveyor unit shown) connected with one another and arranged in longitudinal alinement and in accordance with the length of the conveyor system required. Each main conveyor unit is formed of an upper main conveyor 17 and a lower main conveyor 18 located one above the other and extending parallel with each other in a longitudinal direction.

The upper main conveyor 17 is provided with outer endless main roller bearing link-chains 19 and 20 which engage with the assist or helper infeed drive sprockets 21 and 22, operated by the tail drive power unit 23, and the outfeed main drive sprockets 24 and 25, operated by the head drive power unit 26. Similarly, the lower main conveyor 18 is provided with the outer endless main roller bearing link-chains 27 and 28 which engage with the assist or helper infeed drive sprockets 29 and 30, operated by the tail drive power unit 31, and the outfeed main drive sprockets 32 and 33 which are operated by the head drive power unit 34.

Each of the main conveyors has an endless belt 35 formed of a series of platen sections 36 arranged in parallel rows and abutting one another lengthwise and having their ends 37 secured to their respective outer endless main roller bearing link-chains, which in turn engage with their respective main drive sprockets. Each platen section has a smooth flat top side and an integral longitudinal channel member 38 located on its underside and extending downwardly and lengthwise of the platen section and forming an integral part thereof. The channel member 38 is spaced at a specified distance from the longitudinal edges 41 of the platen section and having their free ends turned inwardly towards one another to form flat surfaces 42 and 43, to which is secured a series of intermediate parallel movable sectional rails 44 extendng across the width of the platen section and beyond the longitudinal edges 41 thereof. Each of the movable sectional rails 44 terminate in recessed ends 45 which engage with the recessed ends of the adjacent movable rail sections that are secured to the adjacent platen sections and thereby completing a series of chains formed of endless intermediate rail sections which move with the endless platen belts.

Each roller bearing link 52 of the outer endless main roller bearing link-chains is formed of the outer and inner link bars 53 and 54, terminating in journal ends 55 and joined to one another by the transverse shafts 56 on which the roller bearings 57 are journalled. The inner link bar 54 has its upper intermediate portion extending laterally at a right angle to form a connector plate 58 and is adapted to be inserted in the channel member 38 of the platen end 37 of the platen 36 and is secured to the undersurface thereof by any suitable means, such as having spacer sleeves or bushings 59 introduced through holes 60 formed in the connector plate 58 and which are in alignment with the threaded countersunk holes 61 formed in the undersurface of the platen 36, and having fastening members 62 extending through the spacer sleeves 59 and engaging with the countersunk holes 61 of the platen, thereby securing the platen to the inner link bar 54 and coincidently allowing restricted vertical movement between the roller bearing link 51 and the platen.

The intermediate conveyors 46 are located within the main conveyors 17 and 18 and are formed of a plurality of inner endless roller bearing link-chain units 47 and effect independent movable support and pressure means for the platens and are independently supported and driven separately from the outer main endless roller bearing link-chains of the conveyors 17 and 18.

The intermediate or inner endless link-chain units 47 extend transversely across the undersides of the platens and are longitudinally situated in the main conveyors and spaced in parallel alinement from one another and in vertical alinement with the intermediate sectional rails 44 that are secured to the channel members 38 of the platens. These intermediate endless roller bearing link-chain units, which may be considered as load chain drives, engage with and are driven by sprockets 48 suitably operated by the power units 49 and are in rolling contact with the fixed rails 50 that extend longitudinally and parallel with one another and which are secured to the frame 51 of the apparatus 15.

The number of intermediate conveyors used for movably supporting the platen conveyor belts and for applying their compressive engagement with the bottom and top surfaces of a product being made, such as a foam laminate, may be varied according to the width and length of the platen conveyor belts and the load applied thereto.

In the accompanying drawings, five intermediate conveyors 46 are shown in each of the upper and lower main conveyors 17 and 18 and are for the purpose of providing "helper" means for freely and movably supporting the endless platen conveyor belts and in applying compressive engagement therewith to the top and bottom surfaces of the product being made, and simultaneously maintaining a freely rolling contact engagement with the fixed rails 50 which terminate at or short of the intermediate conveyor sprockets 48. The fixed rails 50 may be supported by the cross beams 63, secured to the framework of the apparatus 15, and are provided with a series of openings 64 to permit the "return runs" of the endless roller bearing chain units 47 that form the intermediate conveyors 46.

The materials used for producing high-speed production of a pressure generating product may be varied in accordance to what is specifically wanted. If the product requires a cellular structure, a foaming unit 65 is employed for processing the desired fluid compound from chemical fluid charges selected from those known reactants that form the requisite components for the production of the cellular structure. These acceptable chemical charges are kept in separate receptacles, removed therefrom and are blended together into a frothable mixture for the production of the foam material and which is used as the core or the body of a laminated board to be manufactured, or for other products.

For the purpose of an explanation, in describing the operation of the invention, the apparatus and method are employed for producing high-speed production of a laminated board having a cellular structure as only an example of the many diverse products that can be produced by the invention.

The reactioning mix is expressed downwardly from the foam unit 65 onto a moving lower casting surface 66, situated therebeneath to provide substantially continuous coating of the admixed fluids thereon, the moving lower casting surface being in the form of a paperboard or other casting surface.

The feed from a roll of casting surface, such as paperboard, is arranged to pass immediately under the foam unit to form a bottom layer and the reactioning foam mixture lays on the casting surface in the form of a thin film laminate, the lower casting surface being moved along for a predetermined distance, where it is joined by a moving upper surface 67 made of paperboard or other material, and which is superimposed upon the reactioning foam mixture that is carried by the moving lower casting surface, and both the lower and upper surfaces are pulled through the main conveyor unit 16 of the apparatus 15.

The upper and lower casting surfaces, in their "sandwich" formation, are fed and guided from their respective feed rolls into the main conveyor unit 16, where they are engaged by the upper and lower endless platen belts 35, the platen ends of which are secured to the outer endless main roller bearing link-chains of their respective upper and lower main conveyors, which in turn are sprocket-driven by their respective power units, and pulled thereby between the upper and lower main conveyors 17 and 18 through the main conveyor unit 16.

Simultaneously, the intermediate conveyors, located within the upper and lower main drive conveyors 17 and 18 and formed of endless inner roller bearing link-chains, that are situated beneath or above the platen belts, effect intermediate movable support and pressure means for the platens and are operated independently of the means for operating the outer endless main roller bearing link-chains of the upper and lower main drive conveyors.

During the operation of the apparatus, the respective power units run the upper and lower main drive conveyors and the intermediate conveyors at the same speed and are synchronized at all times. Each of the outfeed ends of the upper and lower main drive conveyors has a head drive power unit for driving the main drive sprockets and the pulling of the main outer endless roller bearing link-chains to which are attached the ends of the platens of the platen belt, and a tail drive power unit for driving the infeed main sprockets of the conveyor and the infeed end of the platen belt for the purpose of alleviating the load from the head drive power unit.

The sprockets 48, situated at the "outfeed" end of the intermediate conveyors 46 and engaged by the inner endless roller bearing link-chains of the intermediate conveyors, are driven by the power units 49, while the sprockets located at the "infeed" end of the intermediate conveyors are engaged by the aforesaid inner endless roller bearing link-chains and connected thereby with the power-driven sprockets and together form a combination of a platen belt support and pressure unit which will be driven as a helper drive and torque control drive, and adjustable for the right amount of torque to load assist the main conveyor without affecting the speed of the conveyor.

Although certain embodiments have been given by way of example and illustration, it is obvious that various modifications of the structure and/or the methods may be made without departing from the spirit of the invention as defined in the appended claims. For example, equivalent elements and steps may be substituted for those described, parts may be reversed and various features may be used independently of the use of other features, all without departing from the spirit of the invention.

What I claim is:

1. An apparatus for producing high-speed continuous production of a pressure generating product comprising a main conveyor unit, upper and lower main parallel conveyors secured in said main conveyor unit, said upper and lower main parallel conveyors comprising upper and lower endless platen belts, made from platen sections, and extending parallel with one another and engaged and operated at a predetermined rate of speed by driven sprocket outer main endless roller bearing link-chains, longitudinal movable sectional rails secured to the undersides of said platen sections and movable therewith and in longitudinal engagement with one another, longitudinal fixed rails secured in said main conveyor unit and located in alinement with said movable sectional rails, intermediate conveyors secured within said main conveyor unit and located within each of said upper and lower endless platen belts and formed of sprocket-driven inner parallel endless roller bearing link-chain units in rolling contact between said movable rail sections and said fixed rails and engaged and operated at a predetermined increased rate of speed in relation to the predetermined rate of speed of said upper and lower platen belts, and thereby causing frictional relief between the said movable sectional rails of the platen belts and said fixed rails and simultaneously forcing each platen ahead for abutment engagement with the adjacent platen section.

2. An apparatus for producing high-speed continuous production of a pressure generating product comprising a main conveyor unit, upper and lower main parallel conveyors secured in said main conveyor unit and consisting of upper and lower endless platen belts, a series of platen sections arranged in parallel rows and abutting one another lengthwise, outer endless main roller bearing link-chains secured to the outer ends of said platens and completing the formation of said platen belts and engaged and operated at a predetermined rate of speed by driving sprockets, a series of intermediate longitudinal movable rail sections secured to the underside of each of said platen sections and extending thereacross with their ends protruding beyond their longitudinal edges and engaging with the ends of the adjacent movable rail sections secured to the adjacent platen sections and in longitudinal engagement with one another and movable therewith, longitudinal fixed rails secured in said main conveyor unit and located in alinement with said movable rail sections, intermediate conveyors secured within said main conveyor unit and located within each of said upper and lower endless platen belts and formed of sprocket-driven inner parallel endless roller bearing link-chain units in rolling contact between said movable rail sections and said fixed rails and engaged and operated at a predetermined increased rate of speed in relation to the predetermined rate of speed of said upper and lower platen belts, and thereby causing frictional relief between said movable sectional rails of the platen belts and said fixed rails and simultaneously forcing each platen ahead for abutment engagement with the adjacent platen section.

3. An apparatus as claimed in claim 2, in which each of the platen sections has a smooth flat top side and an integral longitudinal channel member formed on its underside and spaced at a specified distance from the longitudinal edges of the platen edges, and a series of intermediate parallel movable rail sections are individually secured to the longitudinal channel member of its platen section and extend across the width thereof and beyond its longitudinal edges, each of said movable rail sections terminating in recessed ends which engage with the recessed ends of the adjacent movable rail sections that are secured to the adjacent platen sections and thereby completing a series of intermediate chains of endless intermediate rail sections which move with the endless platen belts.

4. An apparatus as claimed in claim 3, in which the longitudinal fixed rails are secured to said main conveyor unit and longitudinally located within said upper and lower main parallel conveyors and in vertical alinement to the chains of endless intermediate rail sections, and a series of sprocket-driven inner endless roller bearing link-chain units longitudinally located within said upper and lower main parallel conveyors and spaced in parallel alinement from one another and in vertical alinement with said movable rail sections and said fixed rails and in independent rolling contact therewith.

* * * * *